(12) United States Patent
DeVries et al.

(10) Patent No.: US 11,635,158 B2
(45) Date of Patent: Apr. 25, 2023

(54) COMPRESSION FERRULE ADAPTER

(71) Applicant: Delta Faucet Company, Indianapolis, IN (US)

(72) Inventors: Adam M. DeVries, Anderson, IN (US); Kurt Judson Thomas, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 606 days.

(21) Appl. No.: 16/540,696

(22) Filed: Aug. 14, 2019

(65) Prior Publication Data

US 2021/0048130 A1 Feb. 18, 2021

(51) Int. Cl.
*F16L 19/065* (2006.01)
*F16L 41/02* (2006.01)
*F16L 19/04* (2006.01)

(52) U.S. Cl.
CPC ........... *F16L 19/065* (2013.01); *F16L 19/045* (2013.01); *F16L 41/021* (2013.01)

(58) Field of Classification Search
CPC ..... F16L 19/02; F16L 19/065; F16L 19/0206; F16L 19/0218; F16L 19/0237; F16L 19/062; F16L 33/18; F16L 33/32
USPC ................ 285/247, 248, 249, 342, 343, 354
See application file for complete search history.

(56) References Cited

U.S. PATENT DOCUMENTS

| | | | |
|---|---|---|---|
| 2,344,698 A | 3/1944 | Howe | |
| 2,737,403 A | 3/1956 | Ellis | |
| 3,112,131 A | 11/1963 | Campbell | |
| 3,233,924 A * | 2/1966 | Stanley | F16L 19/10 285/322 |
| 3,332,708 A | 7/1967 | Jackson et al. | |
| 3,831,983 A | 8/1974 | Stickler | |
| 5,098,134 A | 3/1992 | Monekton | |
| 5,213,375 A | 5/1993 | Wu | |
| 5,375,887 A | 12/1994 | Johnson | |
| 5,388,871 A | 2/1995 | Saitoh | |
| 6,902,205 B2 | 6/2005 | Bouey et al. | |
| 7,497,483 B2 | 3/2009 | Williams et al. | |
| 7,686,352 B2 | 3/2010 | Preston | |
| 7,806,443 B1 * | 10/2010 | Plattner | F16L 19/106 285/332.1 |
| 8,146,955 B2 | 4/2012 | Thomas et al. | |
| 8,813,348 B2 | 8/2014 | Williams et al. | |
| 8,990,974 B2 | 3/2015 | Thomas et al. | |
| 9,163,759 B2 | 10/2015 | Thomas et al. | |

FOREIGN PATENT DOCUMENTS

| | | |
|---|---|---|
| CN | 2079696 U | 6/1991 |
| CN | 103244773 A | 8/2013 |
| CN | 105508777 A | 4/2016 |
| CN | 205383372 U | 7/2016 |
| CN | 108302266 A | 7/2018 |
| EP | 0195140 | 9/1986 |

(Continued)

*Primary Examiner* — Aaron M Dunwoody

(74) *Attorney, Agent, or Firm* — Bose McKinney & Evans LLP

(57) ABSTRACT

A fluid coupler including a ferrule adapter having a body with a receiving bore for receiving a fluid conduit, a stop axially spaced away from the body and configured to engage an end of the fluid conduit, and a connector configured to adjust the axial distance between the body and the stop.

14 Claims, 5 Drawing Sheets

(56) References Cited

FOREIGN PATENT DOCUMENTS

| | | |
|---|---|---|
| EP | 0658715 A1 | 6/1995 |
| EP | 2660498 A2 | 11/2013 |
| GB | 813715 | 5/1959 |
| GB | 2307285 | 5/1997 |

* cited by examiner

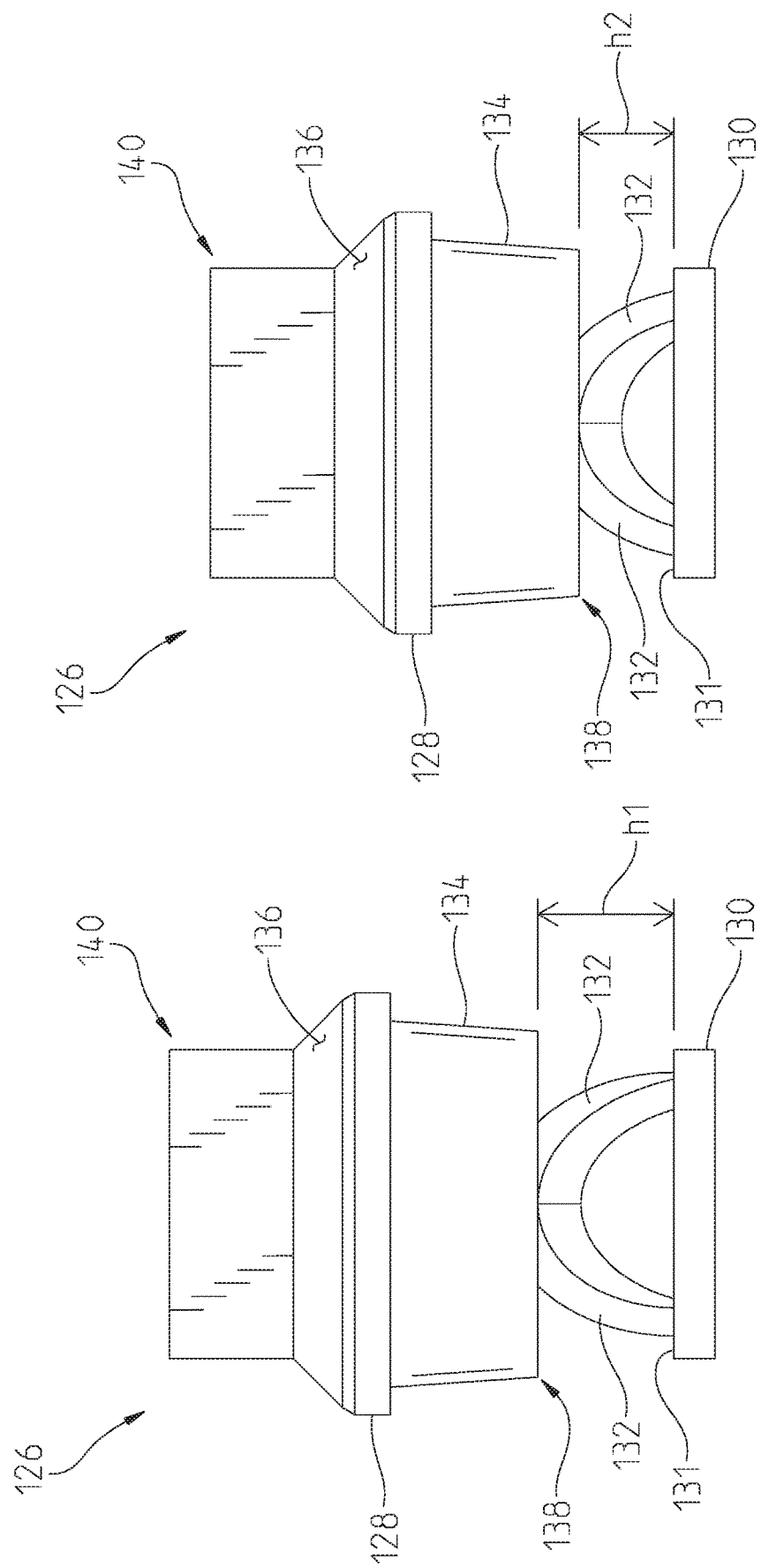

COMPRESSION FERRULE ADAPTER

BACKGROUND AND SUMMARY

The present invention relates generally to fluid couplings and, more particularly, to ferrule adapters used to engage a fluid conduit and a fitting when used with a mounting nut.

Ferrule adapters within water couplings are known. However, there remains a need for a ferrule adapter that accommodates a smaller outer diameter fluid conduit within a larger inner diameter fitting. There also remains a need for a ferrule adapter that allows for an adjustable stop height of the end of a fluid conduit when it is inserted into a fitting.

According to an illustrative embodiment of the present disclosure, a ferrule adapter for use within a fluid coupler is provided. The ferrule adapter includes a body, a stop, and a connector. The body extends along a longitudinal axis between a proximal end and a distal end, and includes a receiving bore configured to receive a fluid conduit. The stop is axially spaced apart from the proximal end of the body and is configured to engage an end of a fluid conduit. The stop and the body are operably coupled by the connector, which is configured to adjust the axial distance between the proximal end of the body and the stop.

In a further illustrative embodiment, the connector comprises a plurality of circumferentially spaced arms operably coupling the body and the stop. In one example, the arms may be made of a flexible material to allow the stop to change its location in relation to the body. Further, the arms may be helically shaped to further allow the stop to adjust location.

In another illustrative embodiment of the present disclosure, a fluid coupler is provided. The fluid coupler includes a fitting, a mounting nut, a fluid conduit, and a ferrule adapter. The fitting includes a receiver having an opening. The receiver is externally threaded to couple with internal threads on the mounting nut. The fluid conduit has an outer diameter less than the inner diameter of the opening of the receiver. The ferrule adapter includes a stop, a body and a first angled surface protruding from the body of the ferrule adapter. The stop is connected to the proximal end of the body and is configured to engage an end of the fluid conduit. The first angled surface extends radially outward from the proximal end of the body towards the distal end. When the mounting nut is threaded onto the fitting, the first angled surface is compressed by an inner surface of the receiver of the fitting such that the ferrule clamps onto an outer surface of the fluid conduit.

In a further illustrative embodiment of the present disclosure, the ferrule adapter further includes a second angled surface. The second angled surface is coupled to the first angled surface and extends radially inward in the direction of the distal end of the body. The second angled surface is located such that when the mounting nut is threaded onto the receiver, the second angled surface engages with an inner surface of the mounting nut.

According to another illustrative embodiment of the present disclosure, a fluid coupler includes a fitting including a receiver having an opening with an inner first diameter, and external threads, and a mounting nut including internal threads to couple with the external threads of the fitting. A fluid conduit includes an end and an outer second diameter, wherein the outer second diameter is less than the inner first diameter. A ferrule adapter concentrically receives the fluid conduit and is supported within the receiver of the fitting. The outer second diameter of the tube is between 10 percent and 75 percent smaller than the inner first diameter of the receiver of the fitting.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 5A is a front view of the ferrule adapter of FIG. 4, with the stop shown in a first axial position; and FIG. 5B is a front view of the ferrule adapter of FIG. 4, with the stop shown in a second axial position.

DETAILED DESCRIPTION OF THE DRAWINGS

The embodiments of the invention described herein are not intended to be exhaustive or to limit the invention to the precise forms disclosed. Rather the embodiments selected for description have been chosen to enable one skilled in the art to practice the invention. Though the disclosure is described with connection to water, it should be understood that other types of fluids may be used.

Figure 1:
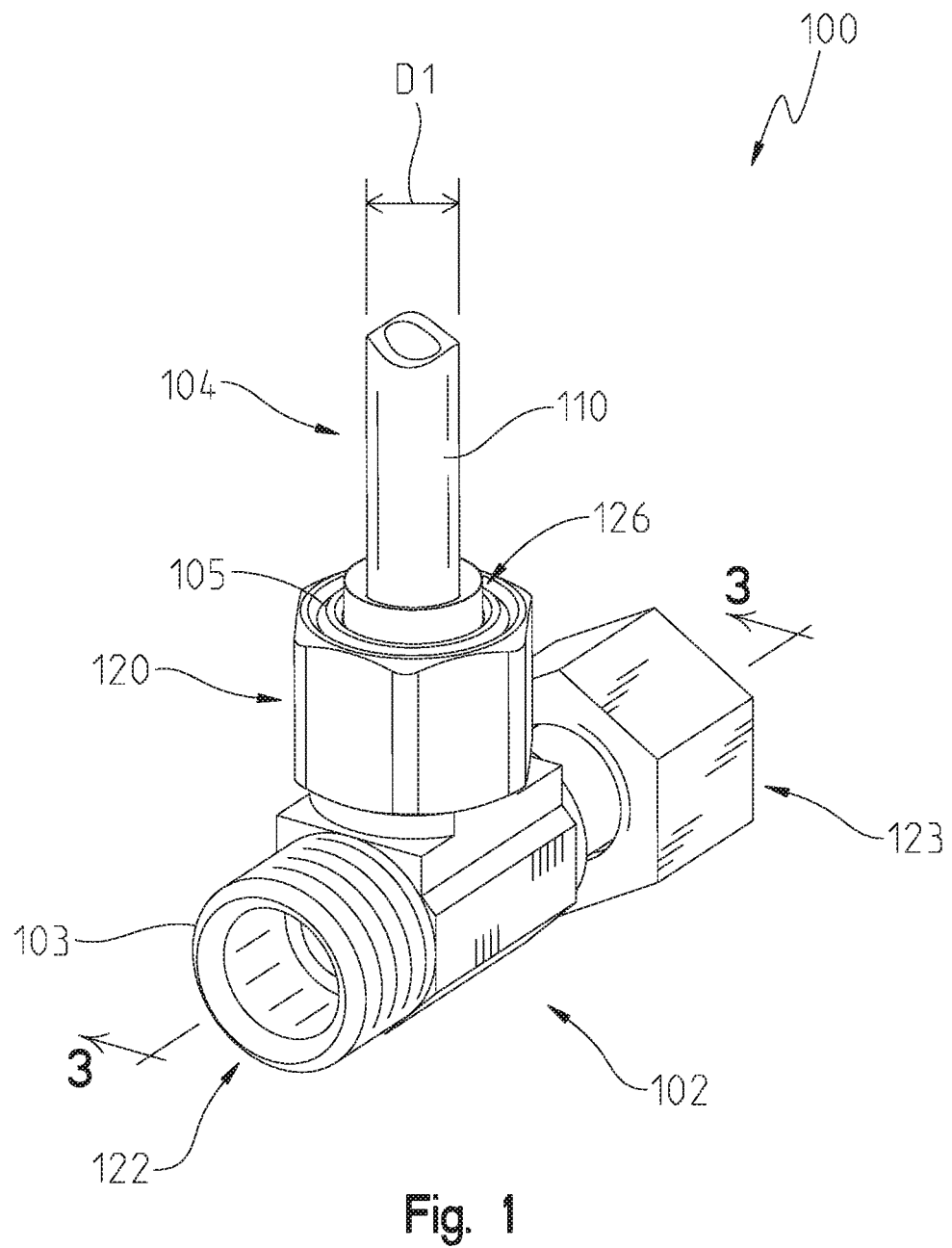
FIG. 1 is a perspective view of the fluid coupler according to an illustrative embodiment of the present disclosure.
Figure 2:
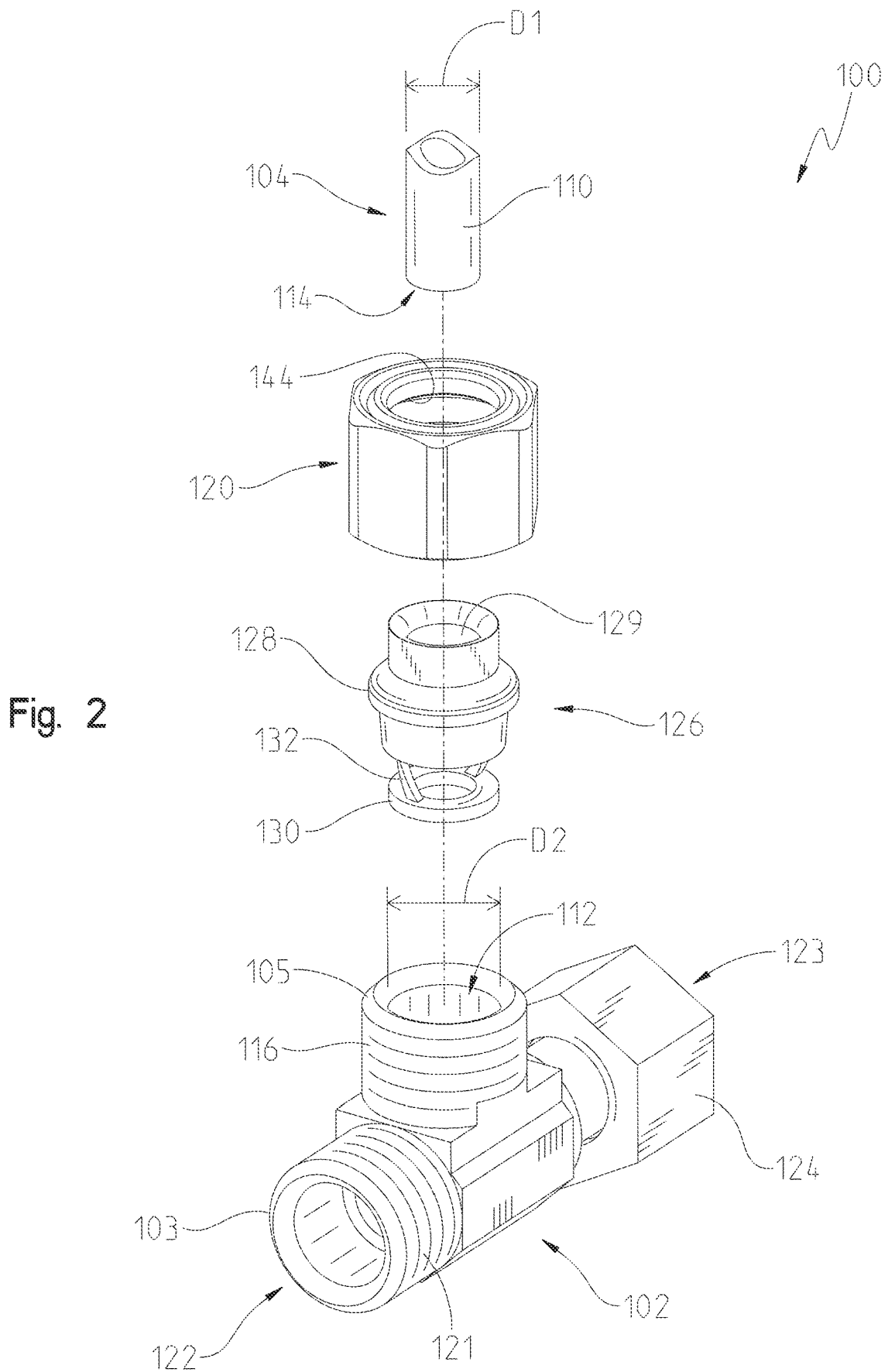
FIG. 2 is an exploded perspective view of the fluid coupler of FIG. 1.

Referring initially to FIGS. 1 and 2, a coupler 100 for a fluid conduit 104 and a fitting 102 is shown. Illustratively, the fitting 102 is a supply stop including an inlet portion 103 and an outlet portion or receiver 105. The fluid conduit 104 illustratively is a tubular member or supply line. The fluid conduit 104 includes a passage 106 through which water can pass, the passage 106 extending along a longitudinal axis 108 (FIG. 3).

Figure 3:
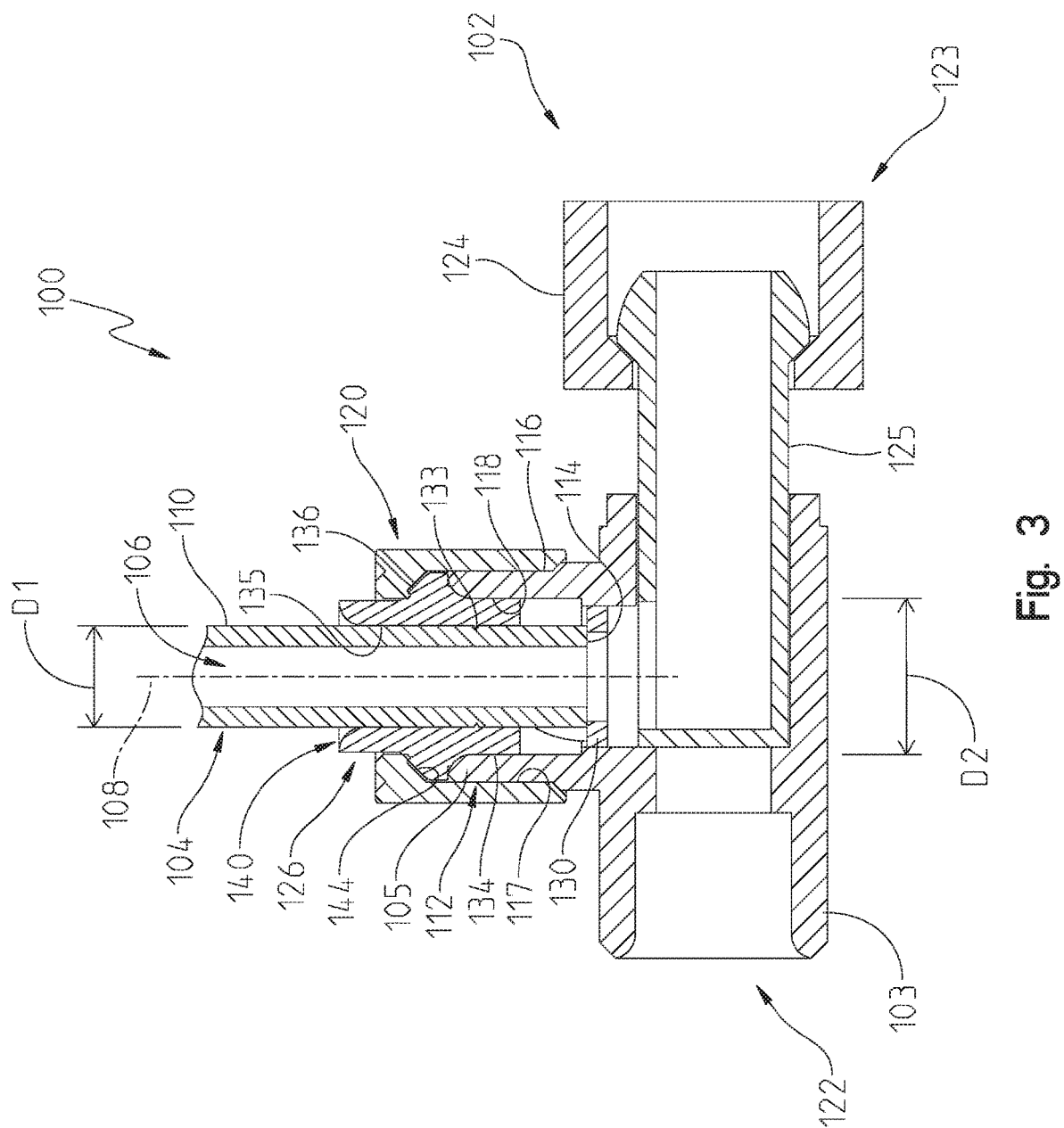
FIG. 3 is a cross-sectional view of the fluid coupler of FIG. 1 taken along line 3-3.

With reference to FIG. 3, the illustrative fluid conduit 104 has a cylindrical outer surface 110 and an outer diameter D1 equal to or less than an inner diameter D2 of a cylindrical receiver opening 112 of the fitting 102. Illustratively, the outer diameter D1 may be between 10 percent and 75 percent smaller than the inner diameter D2. Further illustratively, the outer diameter D1 is between 15 percent and 35 percent smaller than the inner diameter D2. In an illustrative embodiment, the outer diameter D1 is either 5/16 inches or 1/4 inches, while the inner diameter D2 is 3/8 inches. In one illustrative embodiment, the outer diameter D1 of 5/16 inches is 16 percent smaller than the inner diameter D2 of 3/8 inches. In another illustrative embodiment, the outer diameter D1 of 1/4 inches is 33 percent smaller than the inner diameter D2 of 3/8 inches.

The fluid conduit 104 also has a first end 114 (FIG. 2) and a second end (not shown). In one illustrative embodiment, the fluid conduit 104 is a tubular member or supply line made of a generally flexible material. Illustratively, the fluid conduit 104 may be constructed of a cross-linked polyethylene (PEX). However, it should be understood that other materials, including polymers could be used.

In a further illustrative embodiment, a ferrule adapter 126 may be used to accommodate a smaller outer diameter (D1)

fluid conduit 104 within a larger inner diameter (D2) fitting 102. One such example could use the ferrule adapter 126 to connect a ¼-inch supply line 104 to a ⅜-inch supply stop 102.

With further reference to FIG. 2, the fitting 102 has external threads 116 on the receiver 105 which couple with internal threads 117 on a mounting nut 120. The fitting 102 further comprises a second or inlet opening 122 defined by the inlet portion 103, which could connect to a variety of tubular members, illustratively via external threads 121. In an illustrative embodiment, the opening 112 of the receiver 105 and the opening 122 of the inlet portion 103 are perpendicular to each other and form a passage through which water can flow through.

Further, the fitting 102 may include a controlling implement or valve 123 to control the flow of water through the fitting. Illustratively, the controlling implement 123 includes a handle or knob 124 operably coupled to a valve member, such as a rotatable plug 125, which allows more or less water to flow through the receiving opening as it is rotated. However, it should be understood that other implements could be used. Also, it should be understood that the controlling implement is not required for the present invention. Further, other connections utilizing the disclosed coupler could be made than those listed.

Figure 4:
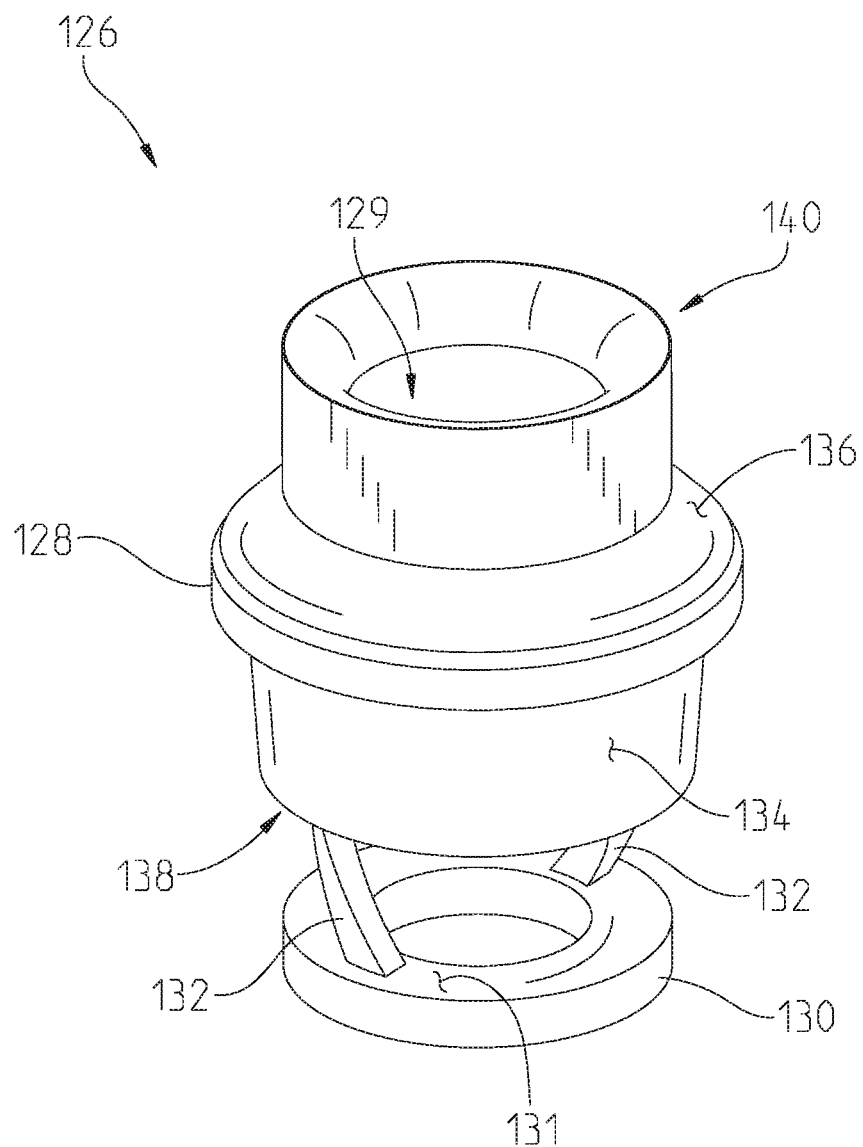
FIG. 4 is a perspective view of an exemplary ferrule adapter.

Referring now to FIG. 4, exemplary ferrule adapter 126 is shown. The ferrule adapter 126 includes a body 128, a stop 130, and connectors 132 extending between the stop 130 and the body 128. The body 128 includes an opening 129 extending between a proximal end 138 and a distal end 140. Illustratively, the stop 130 is an annular ring having a tube engagement surface 131, and the connectors 132 are helically shaped arms, although other shapes and connectors could be used as well. Illustratively, the ferrule adapter 126 is integrally molded from a polymer.

Referring to FIGS. 5A and 5B, the stop 130 of the ferrule adapter 126 is axially adjustable in relation to the proximal end 138 of the body 128. As seen in FIG. 5A, the stop 130 may be in a first position (e.g., a height h1 from the proximal end 138 of the body 128 to the engagement surface 131 of the stop 130). Further, as seen in FIG. 5B, the stop 130 may be in a second position when engaged with the fitting 102 (e.g., a height h2 from the proximal end 138 of the body 128 to the engagement surface 131 of the stop 130). The stop 130 may be variably adjusted to different axial positions (e.g., other than heights h1 and h2). The adjustability of the location of the stop 130 allows for adaptability for different combinations of fittings 102 and fluid conduits 104.

Referring again to FIG. 4, the ferrule adapter 126 further includes a first angled surface 134 and a second angled surface 136. The angled surfaces 134, 136 protrude radially from the body 128. The first angled surface 134 extends radially outward from the proximal end 138 of the body 128 towards the distal end 140 of the body 128. The second angled surface 136, which is coupled to the first angled surface 134, extends radially inward from the proximal end 138 of the body 128 towards the distal end 140 of the body 128. Further details of the angled surfaces 134, 136 are provided below.

Referring now to FIG. 3, the mounting nut 120 is axially located along the longitudinal axis 108 and is movable axially along the outer surface 110 of the fluid conduit 104. The nut 120 can be moved from a first position axially spaced away from the receiver 105 of the fitting 102 (i.e., uncoupled) to a second position, engaged with the receiver 105 (i.e., coupled. as seen in FIGS. 1 and 3).

With further reference to FIG. 3, the fluid conduit 104, the ferrule adapter 126, the mounting nut 120, and the receiver 105 of the fitting 102 are axially aligned along the longitudinal axis 108. As the fluid conduit 104 is inserted into the ferrule adapter 126, the fluid conduit 104 is advanced until the end 114 rests against the stop 130. The stop 130 keeps the fluid conduit 104 from being inserted too far into the fitting 102.

An inner, annular surface 118 of the receiver 105 engages with the first angled surface 134 of the ferrule adapter 126 as the mounting nut 120 is threaded onto the receiver 105 and advances axially toward the fitting 102. In response, the first angled surface 134 is compressed or moved radially inwardly, thereby forming a seal between the receiver 105, the ferrule adapter 126 and the fluid conduit 104.

As the mounting nut 120 is advanced and threadably coupled with the receiver 105, an inside rim 144 of the nut 120 applies a force onto the second angled surface 136, advancing the ferrule adapter 126 with the mounting nut 120 and into the receiver 105. In some embodiments, the distal end 140 of the ferrule adapter 126 passes through an opening in the mounting nut 120 as the mounting nut 120 is advanced.

Illustratively, when the mounting nut 120 and the receiver 105 are engaged, the fitting 102 and the fluid conduit 104 are fluidly coupled. If the coupler 100 is assembled properly, the connections between the fitting 102 and the ferrule adapter 126 and the ferrule adapter 126 and the fluid conduit 104 are substantially leak proof.

The exemplary ferrule adapter 126 may further include an engagement feature 133 on an inner surface 135 of the body 128 (FIG. 3). As the mounting nut 120 is threaded onto the fitting 102, the engagement feature 133 engages the outer surface 110 of the fluid conduit 104. Illustratively, the engagement feature 133 is a sharp edge on the inner surface 135 of the body 128 near the proximal end 138. Those skilled in the art will appreciate that other engagement features could also be used to engage the fluid conduit 104.

Although the invention has been described in detail with reference to certain preferred embodiments, variations and modifications exist within the spirit and scope of the invention as described and defined in the following claims.

What is claimed is:

1. A fluid coupler comprising:
   a fitting defining a first fluid passage having a first fluid passage diameter, the fitting including a receiver including an opening having an inner first diameter, and external threads;
   a mounting nut including internal threads to couple with the external threads of the fitting;
   a fluid conduit defining a second fluid passage having a second fluid passage diameter, the fluid conduit having an end and an outer second diameter, wherein the outer second diameter is less than the inner first diameter and wherein the first fluid passage diameter is larger than the outer second diameter and the second fluid passage diameter; and
   a ferrule adapter including:
   a stop configured to engage the end of the fluid conduit wherein the stop is an annular ring with an inner diameter less than both the inner first diameter of the receiver and the outer second diameter of the fluid conduit;
   a body having a proximal end and a distal end, the proximal end having a plurality of circumferentially spaced arms extending axially from the body and supporting the stop; and a first angled surface protruding from the body of the ferrule adapter, the first angled surface extending radially outward from the proximal end in the direction of the distal end, the first angled surface being compressed by an inner surface of the receiver of the fitting to clamp onto the fluid conduit as the internal threads of the mounting nut are threaded onto the external threads of the fitting.

2. The fluid coupler of claim 1, further comprising a second angled surface, coupled with the first angled surface and extending radially inward in the direction of the distal end, such that the second angled surface engages an inner surface of the mounting nut as the mounting nut is threaded onto the receiver of the fitting.

3. The fluid coupler of claim 1, wherein the fitting and the fluid conduit are fluidly coupled.

4. The fluid coupler of claim 1, wherein the distal end of the ferrule body projects through an opening in the mounting nut when the mounting nut is secured on the receiver of the fitting.

5. The fluid coupler of claim 1, further comprising a plurality of circumferentially spaced arms operably coupling the body and the stop.

6. The fluid coupler of claim 5, wherein the plurality of arms are made of a flexible material such that the stop can axially change position in relation to the body.

7. A fluid coupler comprising:
a fitting defining a first fluid passage having a first fluid passage diameter, the fitting including a receiver having an opening with an inner first diameter, and external threads;
a mounting nut including internal threads to couple with the external threads of the fitting;
a fluid conduit defining a second fluid passage having a second fluid passage diameter, the fluid conduit having an end and an outer second diameter, wherein the outer second diameter is less than the inner first diameter and wherein the first fluid passage diameter is larger than the outer second diameter and the second fluid passage diameter; and
a ferrule adapter concentrically receiving the fluid conduit and supported within the receiver of the fitting;
wherein outer second diameter of the fluid conduit is between 10 percent and 75 percent smaller than the inner first diameter of the receiver of the fitting; and
wherein the ferrule adapter includes:
a stop configured to engage the end of the fluid conduit;
a body having a proximal end and a distal end, the proximal end having a plurality of circumferentially spaced arms extending axially from the body and supporting the stop; and
a first surface protruding from the body of the ferrule adapter, the first surface extending radially outward from the proximal end in the direction of the distal end, the first surface being compressed by an inner surface of the receiver of the fitting to clamp onto the fluid conduit as the internal threads of the mounting nut are threaded onto the external threads of the fitting.

8. The fluid coupler of claim 7, wherein the outer second diameter of the tube is between 15 percent and 35 percent smaller than the inner first diameter of the receiver of the fitting.

9. A fluid coupler comprising:
a fitting including a receiver having an opening with an inner first diameter, and external threads;
a mounting nut including internal threads to couple with the external threads of the fitting;
a fluid conduit having an end and an outer second diameter, wherein the outer second diameter is less than the inner first diameter; and
a ferrule adapter concentrically receiving the fluid conduit and supported within the receiver of the fitting;
wherein outer second diameter of the fluid conduit is between 10 percent and 75 percent smaller than the inner first diameter of the receiver of the fitting; and
wherein the ferrule adapter includes:
a stop configured to engage the end of the fluid conduit;
a body having a proximal end and a distal end, the proximal end supporting the stop;
a first angled surface protruding from the body of the ferrule adapter, the first angled surface extending radially outward from the proximal end in the direction of the distal end, the first angled surface being compressed by an inner surface of the receiver of the fitting to clamp onto the fluid conduit as the internal threads of the mounting nut are threaded onto the external threads of the fitting; and
a plurality of circumferentially spaced arms operably coupling the body and the stop.

10. The fluid coupler of claim 9, wherein the ferrule adapter further comprises a second angled surface, coupled with the first angled surface and extending radially inward in the direction of the distal end, such that the second angled surface engages an inner surface of the mounting nut as the mounting nut is threaded onto the receiver of the fitting.

11. The fluid coupler of claim 9, wherein the distal end of the ferrule body projects through an opening in the mounting nut when the mounting nut is secured on the receiver of the fitting.

12. The fluid coupler of claim 9, wherein the plurality of arms are made of a flexible material such that the stop can axially change position in relation to the body.

13. The fluid coupler of claim 9, wherein the stop is an annular ring with an inner diameter less than an inner diameter of the receiving bore.

14. A ferrule adapter for use within a fluid coupler, the ferrule adapter comprising:
a body extending axially along a longitudinal axis between a proximal end and a distal end, the body including a receiving bore extending along the longitudinal axis, the receiving bore configured to receive a fluid conduit;
a stop axially spaced apart from the proximal end of the body, the stop configured to engage an end of the fluid conduit;
a connector extending between the proximal end of the body and the stop, the connector configured to adjust the axial distance between the proximal end of the body and the stop; and
wherein the connector comprises a plurality of circumferentially spaced arms operably coupling the body and the stop, the arms being made of a flexible material such that the stop can axially change position in relation to the body and wherein the plurality of arms are helically shaped and extend from the proximal end of the body to the stop.

* * * * *